US010949238B2

(12) United States Patent
Dai et al.

(10) Patent No.: US 10,949,238 B2
(45) Date of Patent: Mar. 16, 2021

(54) DECOUPLING COMPUTE AND STORAGE RESOURCES IN CLOUD-BASED HCI (HYPER-CONVERGED INFRASTRUCTURE)

(71) Applicant: VMware, Inc., Palo Alto, CA (US)

(72) Inventors: Peng Dai, Acton, MA (US); Matthew B Amdur, Winchester, MA (US); Christos Karamanolis, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 175 days.

(21) Appl. No.: 16/211,047

(22) Filed: Dec. 5, 2018

(65) Prior Publication Data

US 2020/0183720 A1    Jun. 11, 2020

(51) Int. Cl.
*G06F 9/455* (2018.01)
*G06F 9/50* (2006.01)
*G06F 3/06* (2006.01)

(52) U.S. Cl.
CPC ......... *G06F 9/45558* (2013.01); *G06F 3/067* (2013.01); *G06F 3/0607* (2013.01); *G06F 3/0631* (2013.01); *G06F 3/0665* (2013.01); *G06F 9/5072* (2013.01); *G06F 9/5077* (2013.01); *G06F 2209/45583* (2013.01); *G06F 2209/5011* (2013.01)

(58) Field of Classification Search
CPC .. G06F 9/45558; G06F 9/5077; G06F 3/0607; G06F 3/0631; G06F 3/0665; G06F 3/067; G06F 2209/45583; G06F 2209/5011
See application file for complete search history.

(56) References Cited

U.S. PATENT DOCUMENTS

| | | | |
|---|---|---|---|
| 9,733,966 B1 * | 8/2017 | Stevens | G06F 16/116 |
| 9,841,930 B2 * | 12/2017 | Enohara | G06F 11/1458 |
| 10,521,289 B2 * | 12/2019 | Adamson | G06F 11/0793 |
| 2005/0289218 A1 * | 12/2005 | Rothman | G06F 3/0664 709/203 |
| 2019/0121960 A1 * | 4/2019 | Brown | H04L 41/0893 |
| 2019/0332683 A1 * | 10/2019 | Thummala | H04L 63/102 |
| 2020/0220923 A1 * | 7/2020 | Brandwine | G06F 11/1484 |

* cited by examiner

*Primary Examiner* — Jacob D Dascomb

(57) ABSTRACT

Techniques for decoupling compute and storage resources in a hyper-converged infrastructure (HCI) are provided. In one set of embodiments, a control plane of the HCI deployment can provision a host from a host platform of an infrastructure on which the HCI deployment is implemented and can provision one or more storage volumes from a storage platform of the infrastructure, where the storage platform runs on physical server resources in the infrastructure that are separate from the host platform. The control plane can then cause the one or more storage volumes to be network-attached to the host in a manner that enables a hypervisor of the host to make the one or more storage volumes available, as part of a virtual storage pool, to one or more virtual machines in the HCI deployment for data storage.

21 Claims, 6 Drawing Sheets

DECOUPLING COMPUTE AND STORAGE RESOURCES IN CLOUD-BASED HCI (HYPER-CONVERGED INFRASTRUCTURE)

BACKGROUND

Hyper-converged infrastructure (HCI) is an IT infrastructure model in which both the compute and storage resources of a group of physical servers are virtualized at the hypervisor level. For example, FIG. 1 depicts a conventional HCI deployment 100 comprising physical servers (i.e., hosts) 102(1)-(N) that are part of an on-premises data center 104. Each host 102 includes a hypervisor 106, a set of local compute resources 108 (e.g., CPUs), and a set of local storage resources 110 (e.g., directly-attached solid state disks (SSDs), spinning hard disks, nonvolatile memory (NVM), etc.). Hypervisors 106(1)-(N) are configured to perform the dual functions of (1) virtualizing the local compute resources of their respective hosts 102(1)-(N) and allocating the virtualized compute resources to locally-running virtual machines (VMs) 112, and (2) aggregating the local storage resources 110(1)-(N) of hosts 102(1)-(N) into a virtual storage pool 114 and making virtual storage pool 114 available to VMs 112(1)-(N) for data storage purposes.

In recent years, there has been a movement towards extending HCI from on-premises data centers to the public cloud—in other words, implementing hypervisor-level compute and storage virtualization on the hosts of public (i.e., third-party) cloud infrastructures such as Amazon AWS, Microsoft Azure, Google Cloud, etc., rather than on privately owned machines. This approach is referred to herein as cloud-based HCI. There are three personas in the case of cloud-based HCI: the public cloud provider, the owner/operator of the cloud-based HCI-as-a-Service, and the consumer of the service. The owner/operator of the cloud-based HCI-as-a-Service benefits from the elastic hardware infrastructure of the public cloud provider, including but not limited to the hardware procurement and on-going maintenance. The consumer of the cloud-based HCI-as-a-Service enjoys the usual benefits of a managed service with the same on-premises experiences. Last but not the least, to the public cloud provider, this represents a unique approach to onboard traditional enterprise workloads.

Unfortunately, existing implementations of cloud-based HCI are generally limited to running on fixed form factor hosts in the public cloud that have a predefined ratio of local compute and local storage resources (e.g., X teraflops of local compute and Y terabytes of local storage). This limitation raises a number of problems. First, since each entity (i.e., customer) deploying cloud-based HCI will have their own needs and requirements, this predefined ratio will not be ideal for everyone. For example, some customers may want more storage capacity per host for their applications (or a subset of their applications) while other customers may want less.

Second, from an operational perspective, the manner in which host maintenance and host/disk failures are handled in a public cloud infrastructure is significantly different from an on-premises data center, which has implications for reliability and performance. For example, when any part of a host in a public cloud infrastructure fails (even just a fan), the entire host is typically removed from the cloud infrastructure and replaced with a new one, which usually does not happen in on-premises environments. This removal of the "failed" host means that if, e.g., 10 terabytes of data were maintained on the local storage of that host, the entire 10 terabytes must be moved to and rebuilt on a new host, which can take a significant amount of time and hence lead to lowered storage SLA (service-level agreement) and more impact to customer workloads.

Third, with a fixed form factor host platform, it is not possible for customers to scale their consumption of storage separately from compute. For instance, if a customer wants more storage than provided by, e.g., 50 cloud hosts, the customer must pay the public cloud provider for the use of one or more additional hosts, each of which includes more compute and storage. Thus, in order to scale storage, the customer is forced to also take on additional compute capacity that the customer may not need or want.

DETAILED DESCRIPTION

Figure 1:
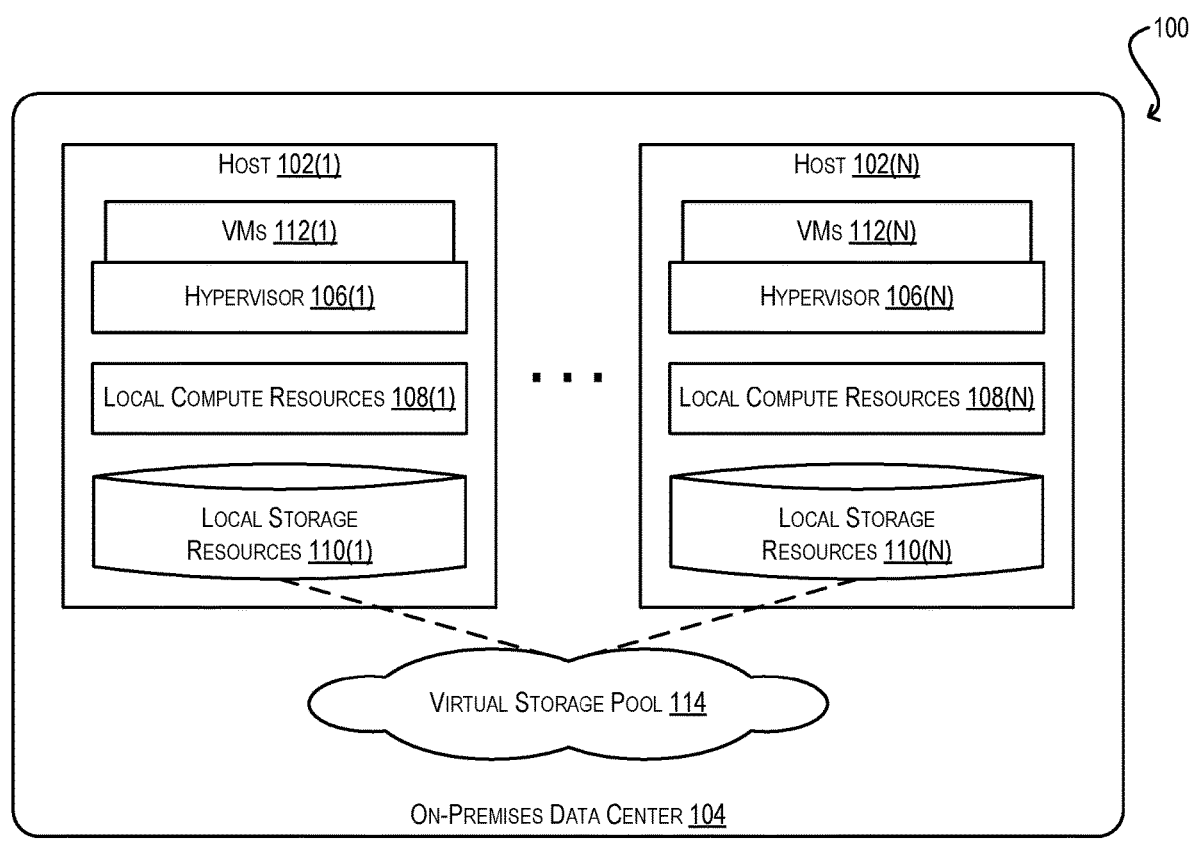
FIG. 1 depicts a cloud-based HCI deployment that employs fixed form factor cloud hosts.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for decoupling compute and storage resources in a cloud-based HCI deployment (i.e., an HCI deployment that is implemented on a public cloud infrastructure such as Amazon AWS, Microsoft Azure, Google Cloud, or the like). These techniques leverage the fact that many public cloud infrastructures provide to customers a cloud storage platform (e.g., Amazon's Elastic Block Store, or EBS) that is separate from the cloud infrastructure's host/compute platform (e.g., Amazon's EC2).

At a high level, the techniques involve (1) provisioning diskless hosts from the public cloud infrastructure's host platform (where a "diskless" host is a host without any local storage resources dedicated to data storage for the HCI deployment), (2) provisioning storage volumes from the public cloud infrastructure's cloud storage platform, (3) and attaching the provisioned storage volumes to the diskless hosts for the purpose of providing data storage within the deployment. The provisioning of the storage volumes is carried out via cloud application programming interfaces (APIs) exposed by the cloud storage platform, and the provisioned storage volumes are made to appear to their attached hosts as local storage devices (although they are network-attached). Thus, the hypervisor of each host can implement storage virtualization with respect to the storage volumes in a manner similar to an actual local storage device.

By employing the separate host and cloud storage platforms of the public cloud infrastructure for instantiating the compute and storage resources of the HCI deployment, many of the problems of existing cloud-based HCI implementations that rely on fixed form factor cloud hosts (e.g., capacity economics, operational complexities arising out of host maintenance and host/disk failure handling, lack of compute/storage consumption flexibility) can be mitigated or avoided. The foregoing and other aspects of the present disclosure are described in further detail below.

It should be noted while the present disclosure specifically describes examples and embodiments pertaining to the decoupling of compute and storage resources in a cloud-based-HCI deployment, the same principles may also be applied to decoupling compute and storage resources in on-premises or private cloud HCI deployments. For example, if HCI is deployed in an on-premises data center that includes separate compute/host and storage platforms, the techniques described in the present disclosure may be used to provision diskless hosts from the host/compute platform of the on-premises data center, and then provision and attach storage volumes from the storage platform of the on-premises data center to those diskless hosts. Accordingly, while the concept of compute/storage separation has particular advantages for the public cloud context, one of ordinary skill in the art should appreciate that embodiments of the present disclosure are not solely limited to that context and instead may be broadly applied to any type of computing infrastructure (whether public cloud, private cloud, or on-premises).

2. Architecture

Figure 2:
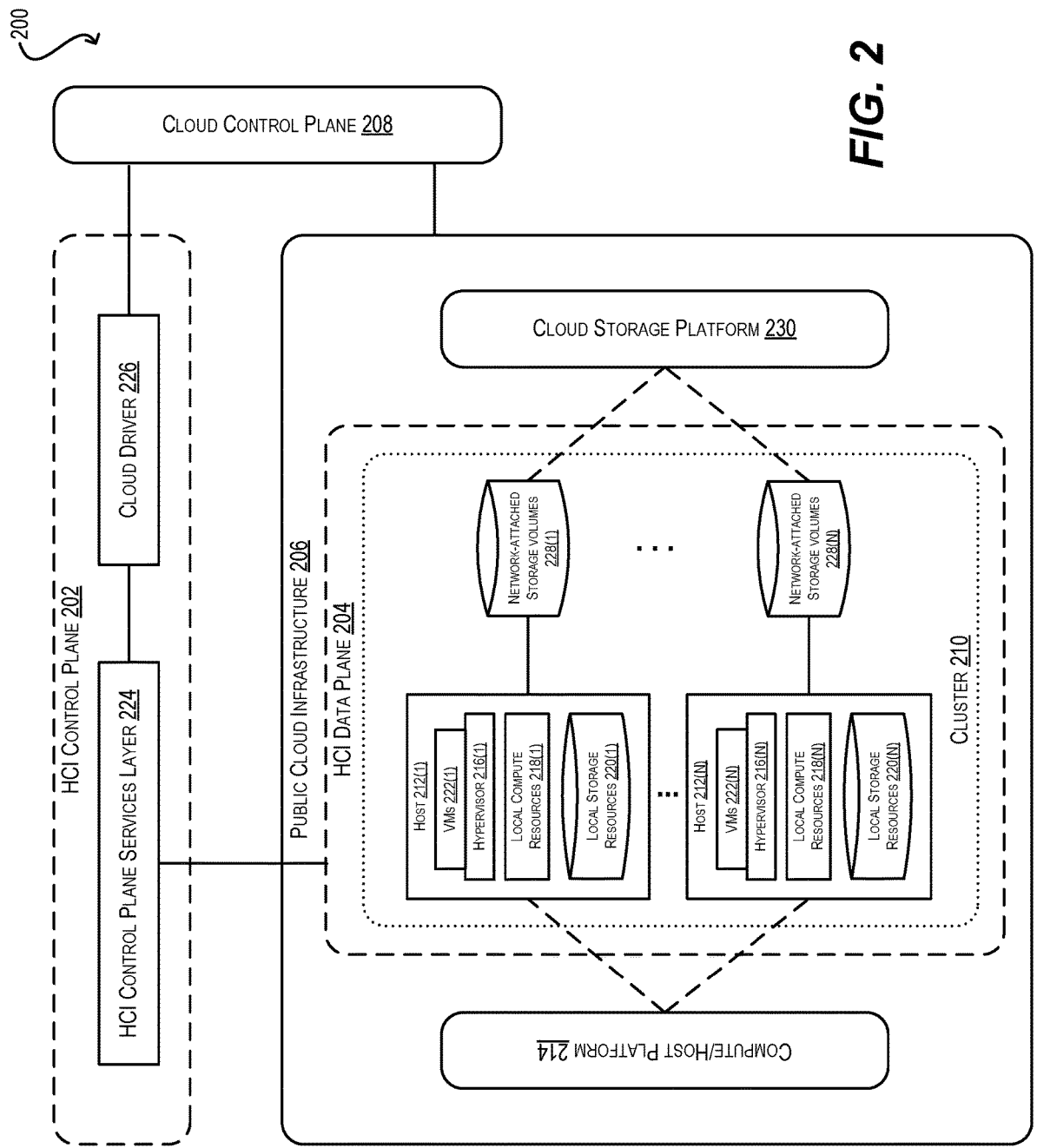
FIG. 2 depicts a cloud-based HCI deployment that implements decoupled compute/storage resources according to an embodiment.

FIG. 2 is a simplified block diagram depicting the architecture of a cloud-based HCI deployment 200 that supports decoupled compute and storage resources according to an embodiment. Deployment 200 includes two primary components: (1) an HCI control plane 202 and (2) an HCI data plane 204 running on top of a public cloud infrastructure 206. As known in the art, a public cloud infrastructure (sometimes referred to simply as a "public cloud") is a collection of computing resources and services that is owned/operated/managed by a third-party provider such as Amazon, Microsoft, Google, etc. and is made available for use by various customers via the Internet. HCI control plane 202 and HCI data plane 204 are communicatively coupled with a cloud control plane 208, which is also implemented and operated by the third-party provider of public cloud infrastructure 206.

HCI data plane 204 is the portion of cloud-based HCI deployment 200 that includes the actual compute and storage resources of the deployment and where the workloads of the deployment are run. As shown, HCI data plane 204 includes a cluster 210 comprising a plurality of hosts 212(1)-(N) corresponding to physical servers provisioned from a compute/host platform 214 of public cloud infrastructure 206. One example of such a compute/host platform is Amazon's EC2. Each host 212, in turn, includes a hypervisor 216, local compute resources 218 (e.g., CPUs), and local storage resources 220 (e.g., directly attached storage/memory modules or devices). Hypervisors 216(1)-(N) are configured to provide an execution environment in which one or more VMs 222(1)-(N) can run.

HCI control plane 202 is the portion of cloud-based HCI deployment 200 that allows the owner/operator of the deployment (i.e., the customer consuming public cloud infrastructure 206) to manage various aspects of HCI data plane 204. These aspects include, e.g., the lifecycles of hosts 212/hypervisors 216, the lifecycles of VMs 222, their respective configurations, and so on. As shown, HCI control plane 202 includes an HCI control plane services layer 224 that communicates with HCI data plane 204 and facilitate/enable these management tasks, as well as a cloud driver 226. Cloud driver 226 is configured to receive requests from HCI control plane services layer 224 for making backend resource allocation changes in public cloud infrastructure 206 with respect to deployment 200 (e.g., provisioning a new host 212 in cluster 210, removing a host, etc.), translate the requests into a format understood by cloud control plane 208, and send the translated requests to cloud control plane 208 for execution.

As noted in the Background section, existing cloud-based HCI implementations generally run on top of fixed form factor cloud hosts which virtualize their local compute and local storage resources for use by the VMs of the deployment. However, this approach suffers from a number of significant drawbacks, including: (1) problematic capacity economics (i.e., the predefined ratio of compute to storage capacity provided by each host will not be ideal for every customer), (2) performance/reliability issues arising out of operational differences between public clouds and traditional on-premises data centers, such as differences in handling host maintenance and host/disk failures, and (3) a lack of consumption flexibility for customers (i.e., inability to scale storage consumption independently of compute consumption).

To address these and other similar issues, cloud-based HCI deployment 200 of FIG. 2 is configured to support a novel decoupled compute/storage configuration where each host 212 in HCI data plane 204 is a "diskless" host (i.e., a host that does not maintain any deployment data on local storage) and is network-connected to one or more storage volumes 228 provisioned from a cloud storage platform 230 of public cloud infrastructure 206. In various embodiments, cloud storage platform 230 is "separate" from compute/host platform 214, which means that these two platforms run on distinct physical hardware/servers within public cloud infrastructure 206. By way of example, in the scenario where public cloud infrastructure 206 is Amazon AWS, the cloud storage platform may be EBS and the compute/host platform may be EC2.

With the decoupled compute/storage configuration depicted in FIG. 2, each hypervisor 216 can virtualize the local compute resources of its respective host for use by the hosts' VMs, but at the same time can virtualize network-attached storage volumes 228 (rather than the host's local storage resources 220) into a cluster-wide virtual storage pool for data storage. Although not shown, each host 212 can include firmware that exposes network-attached storage volumes 228 to the host's hypervisor 216 as directly-attached storage devices (e.g., PCI-E based devices) to support this functionality.

By leveraging network-attached storage volumes 228 rather than local storage resources 220 at each host for data storage, cloud-based HCI deployment 200 can advantageously minimize or eliminate the problems associated with implementing HCI on fixed form factor cloud hosts. For instance, since storage volumes 228 can be attached to or detached from any host 212 at-will, customers are no longer locked into a single fixed ratio of compute-to-storage capacity per host. Instead, customers can configure the exact amount of storage capacity they want on a per-host basis (at the time of, e.g., provisioning cluster 210 or a new host 212)

by instantiating and attaching the appropriate number of (or appropriately sized) storage volumes from cloud storage platform 230. In addition, customers can easily scale the amount of per-host storage capacity, independently from host compute capacity, via this same mechanism.

Further, since storage volumes 228 reside on a hardware platform that is completely separate from hosts 212(1)-(N), it is possible to implement more intelligent routines for handling planned host outages or host/disk failures that reduce the storage-related impacts of those outages/failures.

The remaining sections of this disclosure present workflows and optimizations that may be implemented by HCI control plane services layer 224 and/or hypervisors 216(1)-(N) in order to achieve or support the decoupled compute/storage configuration shown in FIG. 2. In particular, section 3 below describes a control plane workflow for provisioning a new diskless host 212 with one or more attached storage volumes 228, section 4 below describes control plane workflows for intelligently handling a planned host outage and host/disk failures, and section 5 below describes hypervisor-level storage data path optimizations for mitigating potential weaknesses/limitations in the I/O performance of data storage volumes 228.

It should be appreciated that cloud-based HCI deployment 200 of FIG. 2 is illustrative and not intended to limit embodiments of the present disclosure. For example, although FIG. 2 depicts a particular arrangement of entities in deployment 200, other arrangements or configurations are possible depending on the specific implementation. Further, the various entities shown may have subcomponents or functions that are not specifically described. For example, although HCI control plane services layer 224 is depicted as a monolithic entity, this layer may include multiple service components or subcomponents, each of which implements some portion of the functionality attributed to the entity as a whole. Yet further, as mentioned previously, in certain embodiments the techniques of the present disclosure may be implemented on a private cloud or an on-premises data center rather than a public cloud. In those embodiments, public cloud infrastructure 206 shown in FIG. 2 may be interchangeably replaced with a private cloud or on-premises infrastructure. One of ordinary skill in the art will recognize other variations, modifications, and alternatives.

3. Host Provisioning

Figure 3:
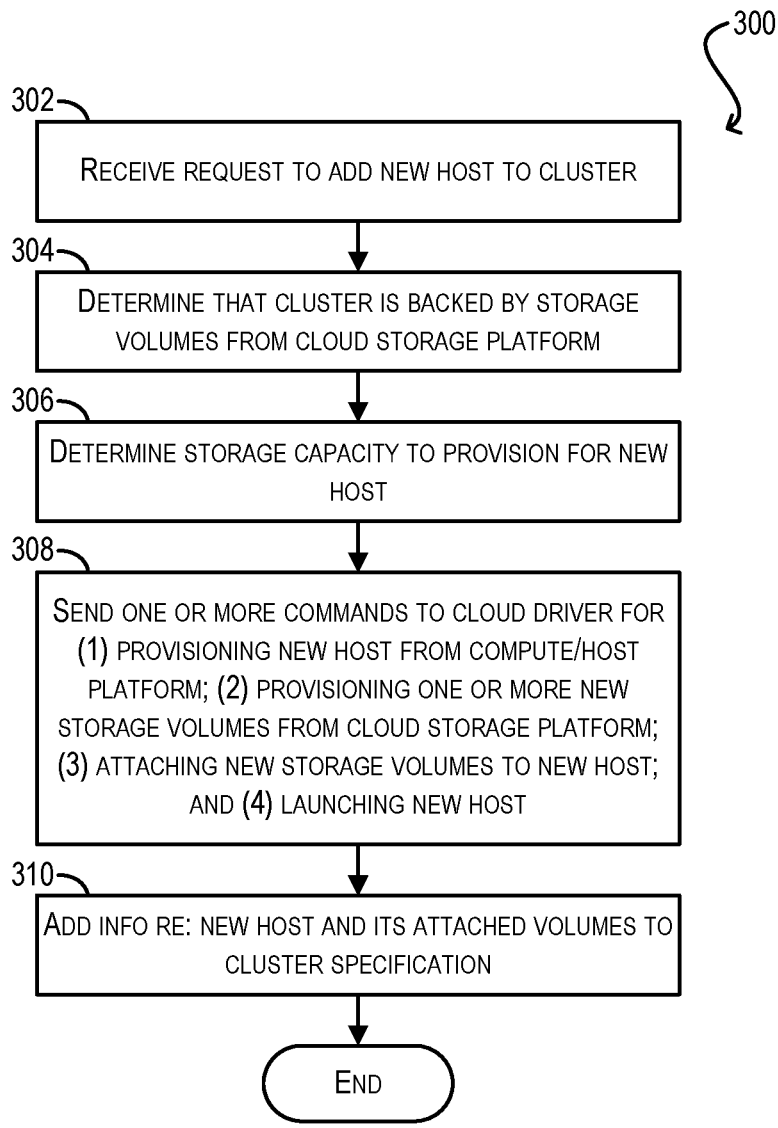
FIG. 3 depicts a workflow for provisioning a new host in the deployment of FIG. 2 according to an embodiment.

FIG. 3 depicts a high-level workflow 300 that may be executed by HCI control plane services layer 224 for provisioning a new diskless host 212 with one or more network-attached storage volumes 228 in deployment 200 of FIG. 2 according to an embodiment.

Starting with block 302, HCI control plane services layer 224 can receive from a user (e.g., an administrator of deployment 200) a request to add a new host to cluster 210. In various embodiments, this request may be received via a web-based graphical user interface or some other interface (e.g., command line interface, programmatic API, etc.) exposed by HCI control plane services layer 224.

In response to receiving the request, HCI control plane services layer 224 can determine that cluster 210 is backed by storage volumes from cloud storage platform 230 (block 304) and can determine a storage capacity to provision for the new host (block 306). This per-host storage capacity may be set at the cluster-level and defined at the time of creating cluster 210.

At block 308, HCI control plane services layer 224 can send one or more commands to cloud driver 226 for (1) provisioning the new host from compute/host platform 214, (2) provisioning one or more new storage volumes 228 from cloud storage platform 230 having the storage capacity determined at block 306, (3) attaching the new storage volumes to the new host, and (4) launching the new host. As used herein, the term "provision" refers to the general act of allocating a resource, such as a host or a storage volume, from a resource pool/platform, such as compute/host platform 214 or cloud storage platform 230, in a way that makes the resource available for use. Upon receiving these commands, cloud driver 226 can interact with cloud service plane 208 to carry out the requested actions within public cloud infrastructure 206.

Finally, at block 310, HCI control plane services layer 224 can add information regarding the newly provisioned host and its attached storage volumes to an internal specification for cluster 210 and workflow 300 can end.

4. Maintenance and Failure Remediation

Figure 4:
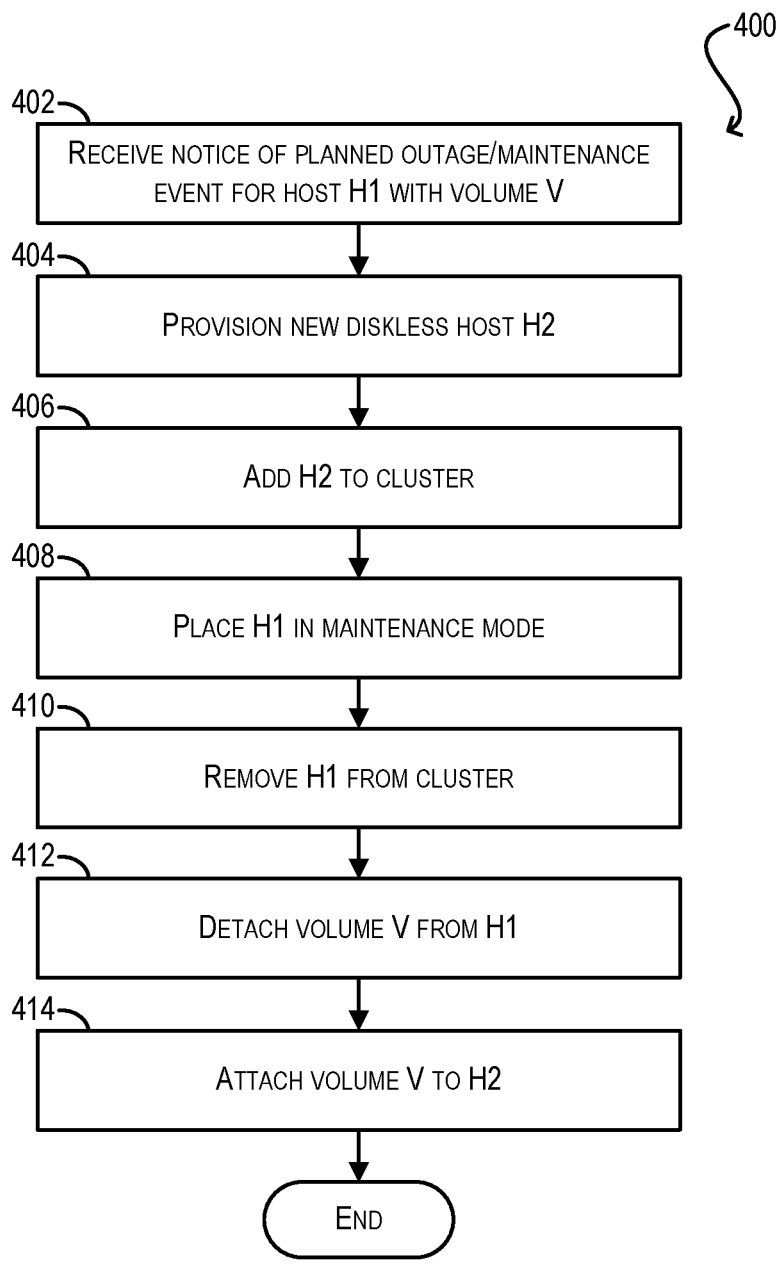
FIG. 4 depicts a workflow for handling a host maintenance event in the deployment of FIG. 2 according to an embodiment.

FIG. 4 depicts a high-level workflow 400 that may be executed by HCI control plane services layer 224 for handling a planned outage/maintenance event for a host within cluster 210 according to an embodiment. This workflow takes advantage of the compute/storage separation in the cluster/deployment in order to minimize the disruption caused by the planned outage.

At block 402, HCI control plane services layer 224 can receive a notification of a planned outage or maintenance event for a particular diskless host H1 within cluster 210 having at least one network-attached storage volume V. In response, HCI control plane services layer 224 can provision and add a new diskless host H2 to cluster 210 (blocks 404 and 406) and can place host H1 in an offline (i.e., maintenance) mode (block 408).

At blocks 410 and 412, HCI control plane services layer 224 can remove host H1 from cluster 210 and detach storage volume V from the host. Finally, at block 414, control plane services layer 224 can attach existing storage volume V to H2. In various embodiments, the attachment of V to host H2 can trigger an incremental resynchronization of the data in storage volume V.

Figure 5:
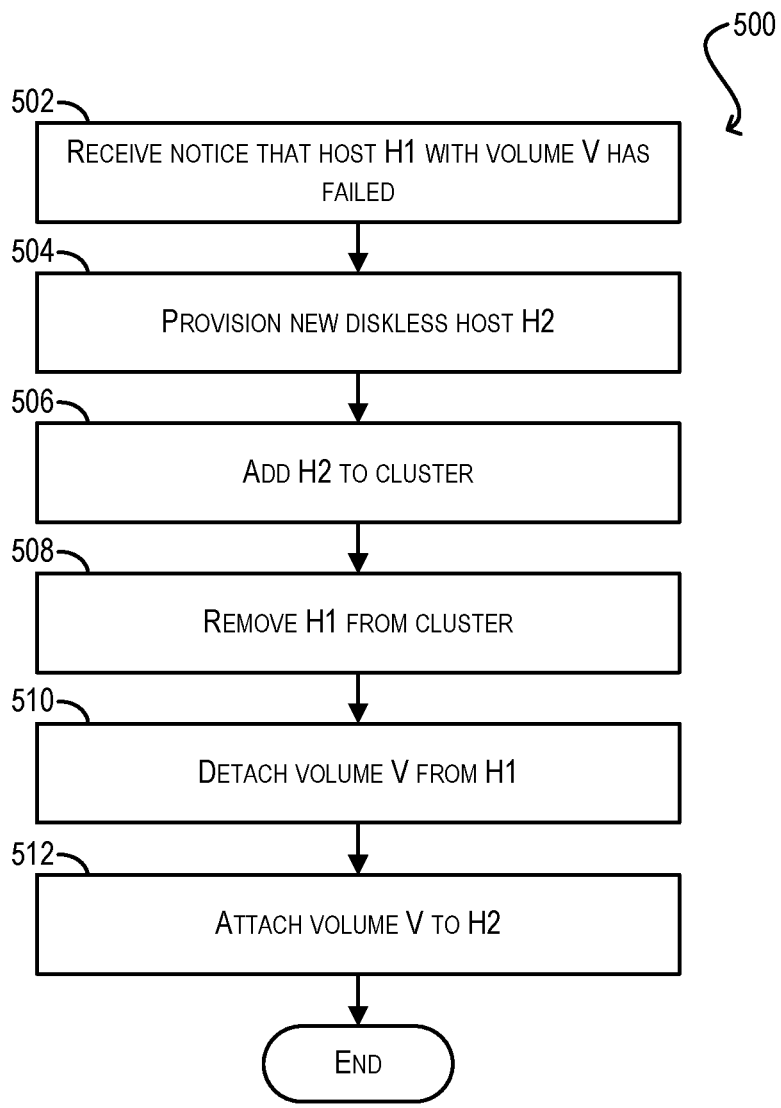
FIG. 5 depicts a workflow for handling a host failure in the deployment of FIG. 2 according to an embodiment.

FIG. 5 depicts a high-level workflow 500 that may be executed by HCI control plane services layer 224 for handling an unexpected failure of a host within cluster 210 according to an embodiment.

Starting with block 502, HCI control plane services layer 224 can receive a notification that a particular diskless host H1 within cluster 210 having at least one network-attached storage volume V has failed and will be (or has been) taken offline. At blocks 504-508, HCI control plane services layer 224 can provision a new diskless host H2, add H2 to cluster 210, and remove host H1 from cluster 210.

Then, at blocks 510 and 512, HCI control plane services layer 224 can detach storage volume V from H1 and attach the volume to H2. As in workflow 400, the attachment of V to H2 can trigger an incremental resynchronization of the data in storage volume V.

Figure 6:
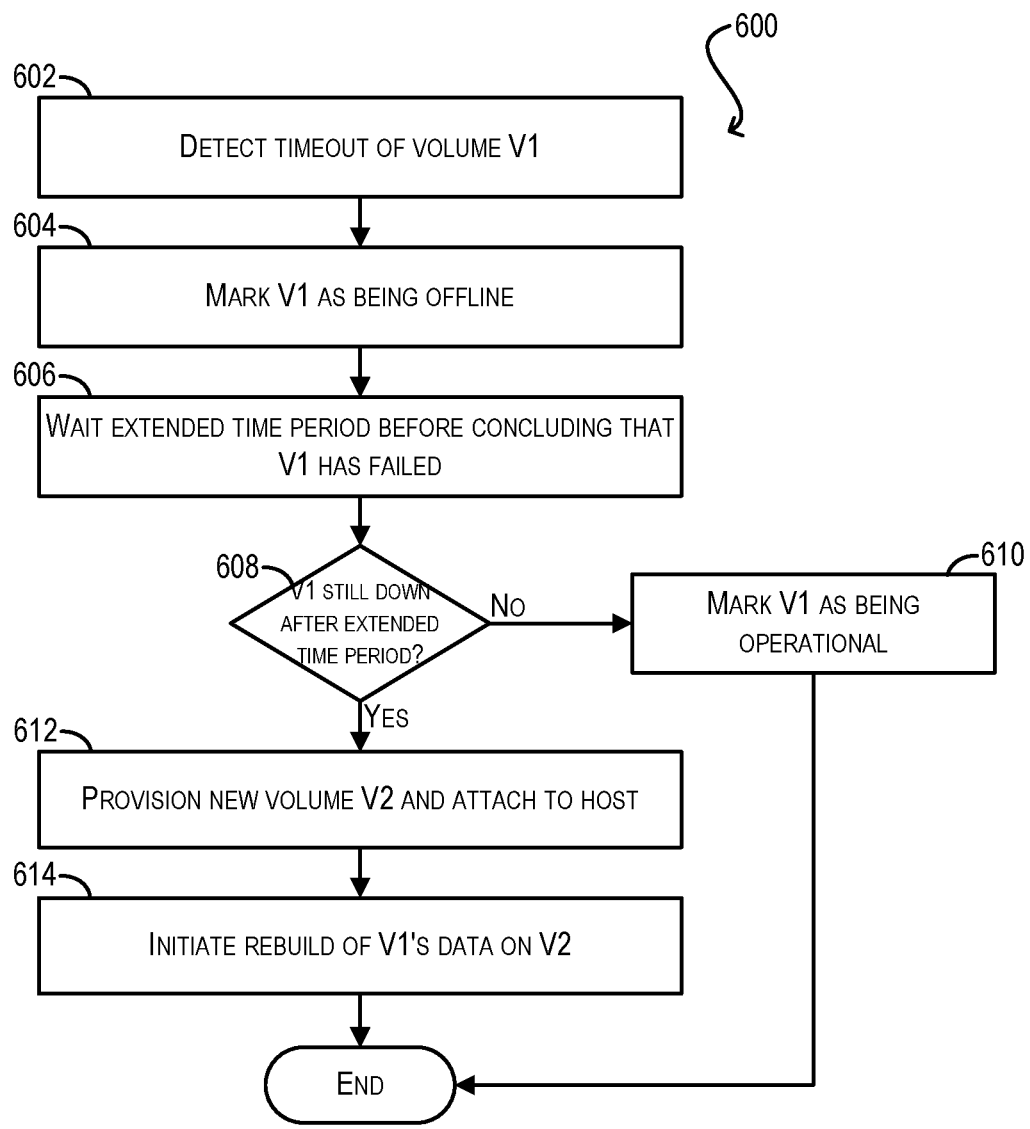
FIG. 6 depicts a workflow for handling a storage volume failure in the deployment of FIG. 2 according to an embodiment.

FIG. 6 depicts a high-level workflow 600 that may be executed by HCI control plane services layer 224 for handling an unexpected failure/timeout of a storage volume V1 attached to a host H within cluster 210 according to an embodiment. In a conventional HCI implementation, when a storage device fails to respond within its timeout period, services layer 224 typically marks the storage device as failed within a relatively short time interval (e.g., 5 to 10 minutes), which causes the data previously residing on that failed device to be rebuilt on a different storage device. This is because if a local storage device doesn't reply within its timeout period, the device has most likely experienced a hardware error that it will not be able to recover from.

On the other hand, in a decoupled compute/storage implementation as depicted in FIG. 2, a timeout of a storage volume 228 provisioned from cloud storage platform 230 is usually a transient problem (e.g., network congestion, etc.) that the volume can recover from over time. Thus, in workflow 600, upon detecting a timeout of storage volume V1 (block 602), HCI control plane services layer 224 can mark V1 as being offline (block 604) but wait an extended time period (e.g., 1 hour or more) before concluding that the volume has failed (which will trigger a complete resynchronization/rebuild of V1's data on a new volume) (block 606). During this time period, it is assumed that the data on V1 is available to clients/VMs via one or more other volumes within cluster 210 that include a copy of the V1 data and are still accessible.

If volume V1 does come back online with the extended time period (block 608), HCI control plane services layer 224 can simply mark V1 as operational again (block 610), thereby avoid the expensive process of rebuilding V1's data on a new volume. Otherwise, HCI control plane services layer 224 can provision and attach a new storage volume V2 to host H (block 612) and initiate the rebuild process on V2 (block 614).

5. Data Path Optimizations

In some public cloud infrastructures, the storage volumes that are provisioned from the infrastructure's cloud storage platform will exhibit performance characteristics that are worse than local storage devices. For example, storage volumes instantiated from Amazon's EBS typically support fewer IOPs and exhibit higher latency that conventional directly-attached SSDs.

To address this, in certain embodiments hypervisors 216 of FIG. 2 can implement optimizations in the data path to storage volumes 228 which mitigate these performance discrepancies. For example, in one set of embodiments, each hypervisor 216 can disable data deduplication on storage volumes 228, which is the process of eliminating duplicate copies of stored data. By disabling data deduplication, the hypervisors can reduce the amount of I/O amplification generated by each I/O write to volumes 228, thereby limiting the impact of reduced IOPs/latency.

In another set of embodiments, each hypervisor 216 can implement techniques for reducing block fragmentation on storage volumes 228, which also reduces I/O amplification. The hypervisors may employ any known data defragmentation algorithm or set of algorithms for this purpose.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for decoupling compute and storage resources in a hyper-converged infrastructure (HCI) deployment, the method comprising:
   receiving, by a control plane of the HCI deployment, a request to add a host to a host cluster of the HCI deployment;
   in response to the request, determining, by the control plane, a storage capacity to provision for the host;
   provisioning, by the control plane, the host from a host platform of an infrastructure on which the HCI deployment is implemented;
   provisioning, by the control plane, one or more storage volumes from a storage platform of the infrastructure, the storage platform running on physical server resources in the infrastructure that are separate from the host platform, the one or more storage volumes having the determined storage capacity; and
   causing, by the control plane, the one or more storage volumes to be network-attached to the host, wherein upon being network-attached to the host, firmware on the host causes the one or more storage volumes to be exposed as directly-attached storage devices to a hypervisor of the host, and
   wherein the hypervisor of the host is configured to make the one or more storage volumes available, as part of a virtual storage pool, to one or more virtual machines in the HCI deployment for data storage.

2. The method of claim 1 wherein the host is a diskless host that does not use any storage resources local to the host for storing data.

3. The method of claim 1 wherein the virtual storage pool also comprises storage volumes provisioned from the storage platform that are network-attached to other hosts in the HCI deployment.

4. The method of claim 1 further comprising, at a time the host is taken offline for maintenance or experiences a failure:
   detaching the one or more storage volumes from the host;
   provisioning a second host from the host platform of the infrastructure; and
   attaching the one or more storage volumes to the second host.

5. The method of claim 1 further comprising, when a timeout is detected with respect to a storage volume in the one or more storage volumes:
   waiting for a period of greater than one hour before concluding that the storage volume has failed.

6. The method of claim 1 wherein the hypervisor is configured to avoid performing data deduplication with respect to data written to the one or more storage volumes.

7. The method of claim 1 wherein the virtual storage pool does not include any local storage resources of the host or other hosts in the HCI deployment.

8. A non-transitory computer readable storage medium having stored thereon program code executable by a control plane of a hyper-converged infrastructure (HCI) deployment, the program code embodying a method for decoupling compute and storage resources in the HCI deployment, the method comprising:
   receiving a request to add a host to a host cluster of the HCI deployment;
   in response to the request, determining a storage capacity to provision for the host;
   provisioning the host from a host platform of an infrastructure on which the HCI deployment is implemented;
   provisioning one or more storage volumes from a storage platform of the infrastructure, the storage platform running on physical server resources in the infrastructure that are separate from the host platform, the one or more storage volumes having the determined storage capacity; and
   causing the one or more storage volumes to be network-attached to the host, wherein upon being network-attached to the host, firmware on the host causes the one or more storage volumes to be exposed as directly-attached storage devices to a hypervisor of the host, and
   wherein the hypervisor of the host is configured to make the one or more storage volumes available, as part of a virtual storage pool, to one or more virtual machines in the HCI deployment for data storage.

9. The non-transitory computer readable storage medium of claim 8 wherein the host is a diskless host that does not use any storage resources local to the host for storing data.

10. The non-transitory computer readable storage medium of claim 8 wherein the virtual storage pool also comprises storage volumes provisioned from the storage platform that are network-attached to other hosts in the HCI deployment.

11. The non-transitory computer readable storage medium of claim 8 wherein the method further comprises, at a time the host is taken offline for maintenance or experiences a failure:
   detaching the one or more storage volumes from the host;
   provisioning a second host from the host platform of the infrastructure; and
   attaching the one or more storage volumes to the second host.

12. The non-transitory computer readable storage medium of claim 8 wherein the method further comprises, when a timeout is detected with respect to a storage volume in the one or more storage volumes:
   waiting for a period of greater than one hour before concluding that the storage volume has failed.

13. The non-transitory computer readable storage medium of claim 8 wherein the hypervisor is configured to avoid performing data deduplication with respect to data written to the one or more storage volumes.

14. The non-transitory computer readable storage medium of claim 8 wherein the virtual storage pool does not include any local storage resources of the host or other hosts in the HCI deployment.

15. A computer system implemented as part of a control plane of a hyper-converged infrastructure (HCI) deployment, the HCI deployment, the computer system comprising:
   a processor; and
   a non-transitory computer readable medium having stored thereon program code that, when executed, causes the processor to:
      receive a request to add a host to a host cluster of the HCI deployment;
      in response to the request, determine a storage capacity to provision for the host;
      provision the host from a host platform of an infrastructure on which the HCI deployment is implemented;
      provision one or more storage volumes from a storage platform of the infrastructure, the storage platform running on physical server resources in the infrastructure that are separate from the host platform, the one or more storage volumes having the determined storage capacity; and cause the one or more storage volumes to be network-attached to the host, wherein upon being network-attached to the host, firmware on the host causes the one or more storage volumes to be exposed as directly-attached storage devices to a hypervisor of the host, and wherein the hypervisor of the host is configured to make the one or more storage volumes available, as part of a virtual storage pool, to one or more virtual machines in the HCI deployment for data storage.

16. The computer system of claim 15 wherein the host is a diskless host that does not use any storage resources local to the host for storing data.

17. The computer system of claim 15 wherein the virtual storage pool also comprises storage volumes provisioned from the storage platform that are network-attached to other hosts in the HCI deployment.

18. The computer system of claim 15 wherein the program code further comprises code that causes the processor to, at a time the host is taken offline for maintenance or experiences a failure:
    detach the one or more storage volumes from the host;
    provision a second host from the host platform of the infrastructure; and
    attach the one or more storage volumes to the second host.

19. The computer system of claim 15 wherein the program code further comprises code that causes the processor to, when a timeout is detected with respect to a storage volume in the one or more storage volumes:
    wait for a period of greater than one hour before concluding that the storage volume has failed.

20. The computer system of claim 15 wherein the hypervisor is configured to avoid performing data deduplication with respect to data written to the one or more storage volumes.

21. The computer system of claim 15 wherein the virtual storage pool does not include any local storage resources of the host or other hosts in the HCI deployment.

* * * * *